(12) United States Patent
Yun et al.

(10) Patent No.: US 11,776,745 B2
(45) Date of Patent: Oct. 3, 2023

(54) MULTILAYER CAPACITOR INCLUDING DIELECTRIC LAYER WITH GRAINS HAVING PORES

(71) Applicant: SAMSUNG ELECTRO-MECHANICS CO., LTD., Suwon-si (KR)

(72) Inventors: Ki Myoung Yun, Suwon-si (KR); Joon Yeob Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 117 days.

(21) Appl. No.: 17/408,191

(22) Filed: Aug. 20, 2021

(65) Prior Publication Data

US 2022/0157527 A1   May 19, 2022

(30) Foreign Application Priority Data

Nov. 17, 2020 (KR) .................. 10-2020-0153477

(51) Int. Cl.
  *H01G 4/06*   (2006.01)
  *H01G 4/30*   (2006.01)
  *H01G 4/232*  (2006.01)

(52) U.S. Cl.
  CPC .............. *H01G 4/06* (2013.01); *H01G 4/30* (2013.01); *H01G 4/232* (2013.01)

(58) Field of Classification Search
  CPC .. H01G 4/06; H01G 4/08; H01G 4/30; H01G 4/232; H01G 4/1227; H01G 4/1209; H01G 4/012
  See application file for complete search history.

(56) References Cited

U.S. PATENT DOCUMENTS

| 2008/0266751 | A1  |     | 10/2008 | Yamazaki et al. |
|--------------|-----|-----|---------|-----------------|
| 2015/0348712 | A1  | *   | 12/2015 | Lee .......................... H01G 4/30 156/89.12 |

FOREIGN PATENT DOCUMENTS

| JP | 3204933       | B2 |   | 9/2001  |           |
|----|---------------|----|---|---------|-----------|
| JP | 2006036603    | A  | * | 2/2006  |           |
| JP | WO2007-074731 | A1 |   | 7/2007  |           |
| JP | 4991564       | B2 |   | 8/2012  |           |
| KR | 20170064490   | A  | * | 6/2017  |           |
| WO | WO-2014207900 | A1 | * | 12/2014 | ......... C04B 35/4682 |

* cited by examiner

*Primary Examiner* — David M Sinclair
*Assistant Examiner* — Daniel M Dubuisson
(74) *Attorney, Agent, or Firm* — MORGAN, LEWIS & BOCKIUS LLP

(57) ABSTRACT

A multilayer capacitor includes a body including a dielectric layer and internal electrodes; and an external electrode disposed on the body to be connected to the internal electrode, wherein the dielectric layer includes a plurality of grains having a core-shell structure having a pore in a core, and the dielectric layer includes 20% to 40% of grains having two or less pores, among the plurality of grains.

18 Claims, 4 Drawing Sheets

MULTILAYER CAPACITOR INCLUDING DIELECTRIC LAYER WITH GRAINS HAVING PORES

CROSS-REFERENCE TO RELATED APPLICATION(S)

This application claims the benefit of priority to Korean Patent Application No. 10-2020-0153477, filed on Nov. 17, 2020 in the Korean Intellectual Property Office, the disclosure of which is incorporated herein by reference in its entirety.

BACKGROUND

1. Field

The present disclosure relates to a multilayer capacitor.

2. Description of Related Art

In the latest smartphones, a large number of multilayer capacitors, up to about 1000, may be used, and there is a growing demand for decreasing the size and increasing the capacitance of multilayer capacitors.

In order to decrease the size and increase the capacitance of multilayer capacitors, it is necessary to thin a dielectric layer and an internal electrode layer thereof.

However, when layers are thinned, since a voltage applied between the layers may increase, it is difficult to secure reliability of the multilayer capacitors.

SUMMARY

An aspect of the present disclosure is to provide a multilayer capacitor capable of implementing relatively high dielectric properties while reducing deteriorations in reliability, even when a thickness of a dielectric layer is reduced.

According to an aspect of the present disclosure, a multilayer capacitor includes a body including a dielectric layer and internal electrodes; and an external electrode disposed on the body to be connected to the internal electrode, wherein the dielectric layer includes a plurality of grains having a core-shell structure having a pore in a core, and the dielectric layer includes 20% to 40% of grains having two or less pores, among the plurality of grains.

In an embodiment of the present disclosure, an average size of the plurality of grains in the dielectric layer may be 200 nm or less.

In an embodiment of the present disclosure, an average thickness of the dielectric layer may be 0.7 μm or less.

In an embodiment of the present disclosure, a dielectric constant of the dielectric layer may be 2500 to 4000.

In an embodiment of the present disclosure, a ratio having a dielectric constant to an average grain size in the dielectric layer may be 20 or more.

In an embodiment of the present disclosure, the body may include first and second surfaces opposing each other, third and fourth surfaces connected to the first and second surfaces and opposing each other, and fifth and sixth surfaces connected to the first and second surfaces, connected to the third and fourth surfaces, and opposing each other, and the internal electrodes may include first and second internal electrodes respectively exposed from the third and fourth surfaces of the body.

In an embodiment of the present disclosure, the external electrode may include a pair of connection portions respectively disposed on the third and fourth surfaces of the body; and a pair of bend portions respectively extending from the pair of connection portions onto the first surface of the body.

In an embodiment of the present disclosure, the body may include an active region including the first and second internal electrodes; and upper and lower cover portions respectively disposed above and below the active region in a direction in which the first and second surfaces oppose each other.

According to another aspect of the present disclosure, a multilayer capacitor includes a body including a dielectric layer, including a plurality of grains, and internal electrodes; and an external electrode disposed on the body to be connected to the internal electrodes, wherein each of the plurality of grains has a core-shell structure including a pore in a core, and a ratio of grains having two or less pores in a region of the body, among a predetermined number of grains in the region of the body, is 20% to 40%.

According to another aspect of the present disclosure, a multilayer capacitor includes a body including a dielectric layer, including a plurality of grains, and internal electrodes; and an external electrode disposed on the body to be connected to the internal electrodes, wherein each of the plurality of grains has a core-shell structure including a pore in a core, and an average of ratios of grains having two or less pores, among grains respectively obtained in a plurality of unit areas in a cut surface of the body, is 20% to 40%.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
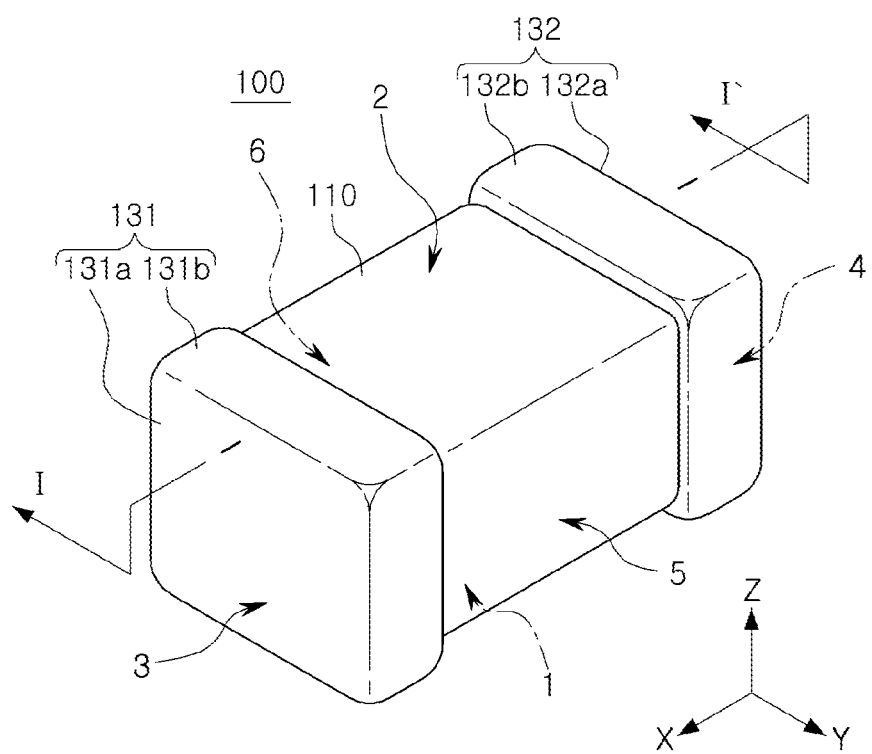
FIG. 1 is a perspective view schematically illustrating a multilayer capacitor according to an embodiment of the present disclosure.

Hereinafter, preferred embodiments of the present disclosure will be described with reference to the accompanying drawings.

However, embodiments of the present disclosure may be modified in various other forms, and the scope of the present disclosure is not limited to the embodiments described below.

In addition, embodiments of the present disclosure may be provided to more completely describe the present disclosure to those having average knowledge in the art.

Therefore, the shapes and sizes of elements in the drawings may be exaggerated for clarity, and elements indicated by the same reference numerals in the drawings may be the same elements.

In addition, the same reference numerals may be used throughout the drawings for portions having similar functions and functions.

In addition, "including" or "comprising" a certain component throughout the specification refers that other components may be further included rather than excluding other components unless specifically stated to the contrary.

Hereinafter, when a direction of a multilayer capacitor is defined to clearly describe an embodiment of the present disclosure, X, Y, and Z indicated in the drawings represent a length direction, a width direction, and a thickness direction of a body 110, respectively, or represent a first direction, a second direction, and a third direction, respectively.

Further, in this embodiment, the Z direction may be used in the same concept as a stacking direction in which dielectric layers 111 are stacked.

Figure 2:
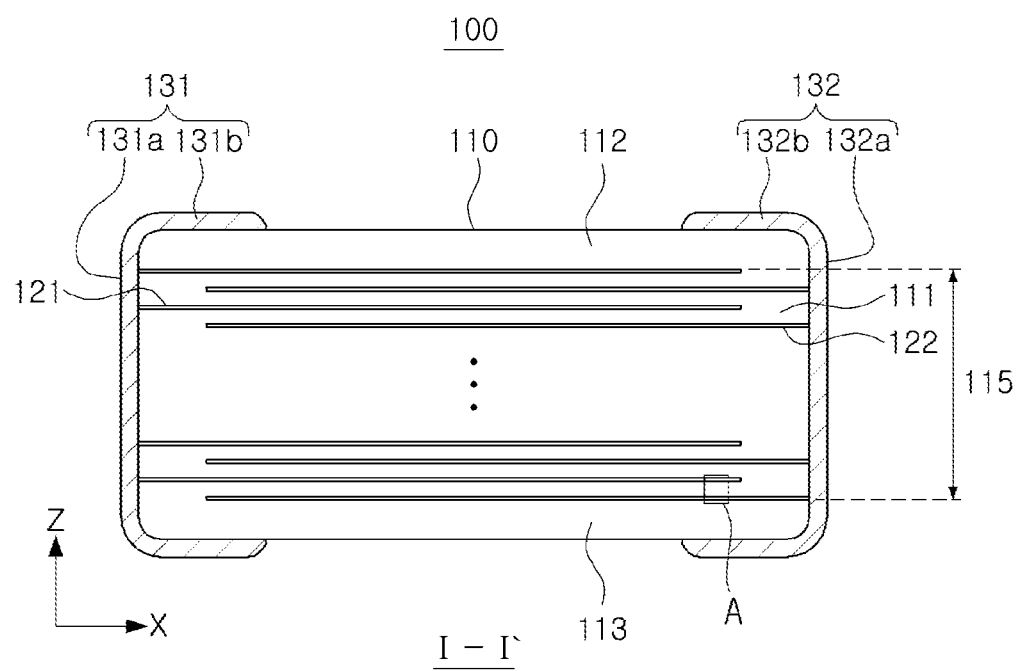
FIG. 2 is a cross-sectional view of FIG. 1, taken along line I-I'.
Figure 3:
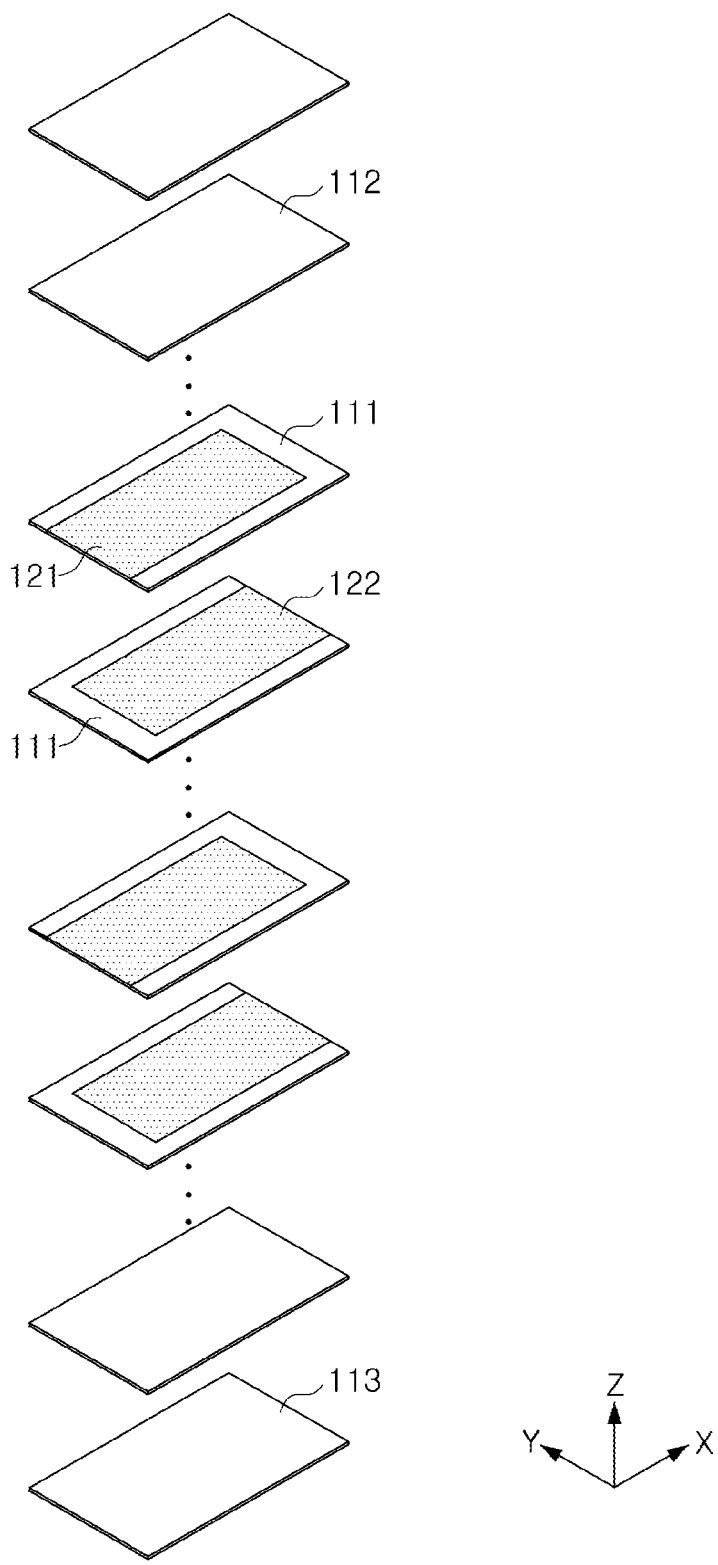
FIG. 3 is an exploded perspective view illustrating a structure of a dielectric layer and an internal electrode of a body according to an embodiment of the present disclosure.

FIG. 1 is a perspective view schematically illustrating a multilayer capacitor according to an embodiment of the present disclosure, and FIG. 2 is a cross-sectional view of FIG. 1, taken along line I-I'. FIG. 3 is an exploded perspective view illustrating a structure of a dielectric layer and an internal electrode of a body according to an embodiment of the present disclosure.

Referring to FIGS. 1 to 3, a multilayer capacitor 100 according to this embodiment may include a body 110 including a plurality of dielectric layers 111 and first and second internal electrodes 121 and 122, and first and second external electrodes 131 and 132.

The body 110 may be obtained by stacking and sintering the plurality of dielectric layers 111 in the Z direction, and may be integrated to the extent that a boundary between the dielectric layers 111 adjacent to each other in the body 110 is difficult to be identified without using a scanning electron microscope (SEM).

In this case, the body 110 is not particularly limited, but may have a substantially rectangular parallelepiped shape. The present disclosure is not limited thereto.

In addition, a shape and dimensions of the body 110 and the number of dielectric layers 111 to be stacked are not limited to those illustrated in the drawings of this embodiment.

In this embodiment, for convenience of explanation, both surfaces of the body 110 opposing each other in the Z direction may be defined as first and second surfaces 1 and 2, both surfaces of the body 110 connected to the first and second surfaces 1 and 2 and opposing each other in the X direction may be defined as third and fourth surfaces 3 and 4, and both surfaces of the body 110 connected to the first and second surfaces 1 and 2, connected to the third and fourth surfaces 3 and 4, and opposing each other in the Y direction may be defined as fifth and sixth surfaces 5 and 6.

In this embodiment, a mounting surface of the multilayer capacitor 100 may be the first surface 1 of the body 110.

The dielectric layer 111 included in the body 110 may formed by including a dielectric composition.

Figure 4:
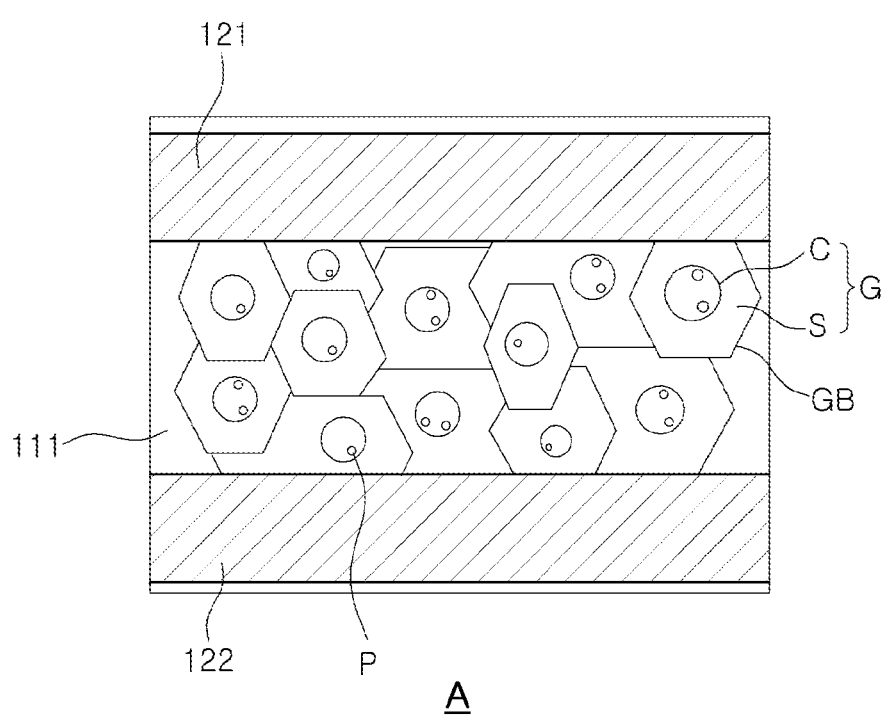
FIG. 4 is a cross-sectional view illustrating an enlarged portion A in FIG. 2.

In addition, as illustrated in FIG. 4, a grain G of the dielectric layer 111 may have a core C having a tetragonal phase and a shell S solid-dissolving various additives to have mainly a pseudo-cubic phase, to form a core-shell structure, and a pore P may be present in the core C. In FIG. 4, the abbreviation GB denotes a grain boundary.

In this case, the dielectric layer 111 may include 20 to 40% of grains G having two or less pores P.

In addition, an average thickness of the dielectric layer 111 may be 0.7 μm or less.

In one example, a thickness of an element (e.g., the thickness of the dielectric layer 111, etc.) in the present disclosure may mean a dimension of the element in a direction perpendicular to a planar surface of the element. The thickness of the element may be any one of an average thickness, a maximum thickness, a minimum thickness, or a thickness of the element measured in a predetermined region, unless contradictory to another definition explicitly described. In one example, the thickness of the element may be determined by defining a predetermined number (e.g., 5) of points to the left and the predetermined number (e.g., 5) of points to the right from a reference center point of the element at equal intervals (or non-equal intervals, alternatively), measuring a thickness of each of the points at equal intervals (or non-equal intervals, alternatively), and obtaining an average value therefrom. Alternatively, the thickness may be the maximum thickness or the minimum thickness of the multiple measurements. Alternatively, the thickness may be a thickness of the reference center point in the measured region. In one example, an optical microscope or a scanning electron microscope (SEM) may be used in the measurement, although the present disclosure is not limited thereto. Other measurement methods and/or tools appreciated by one of ordinary skill in the art, even if not described in the present disclosure, may also be used.

In addition, a dielectric constant of the dielectric layer 111 may be 2500 to 4000.

In addition, an average size of the grains G included in the dielectric layer 111 may be 200 nm or less. In another example, the size of the grains G included in the dielectric layer 111 may be an average grain size among multiple grains.

In addition, a ratio having a dielectric constant to an average grain size in the dielectric layer 111 may be 20 or more.

In addition, the body 110 may include an active region 115 as a portion contributing to formation of capacitance of the capacitor, and upper and lower cover portions 112 and 113 respectively formed above and below the active region 115 in the Z direction as upper and lower margins.

The upper and lower cover portions 112 and 113 may have the same material and configuration as the dielectric layer 111 of the active region 115, except that the upper and lower cover portions 112 and 113 do not include internal electrodes.

In this case, the upper and lower cover portions 112 and 113 may be formed by respectively stacking a single dielectric layer or two or more dielectric layers on upper and lower surfaces of the active region 115 in the Z direction.

The upper and lower cover portions 112 and 113 may fundamentally prevent damage to the first and second internal electrodes 121 and 122 due to physical or chemical stress.

The first and second internal electrodes 121 and 122 may be electrodes to which different polarities are applied, and may be alternately disposed in the Z direction with the dielectric layer 111 interposed therebetween, and one ends of the first and second internal electrodes 121 and 122 may be respectively exposed from the third and fourth surfaces 3 and 4 of the body 110.

In this case, the first and second internal electrodes 121 and 122 may be electrically insulated from each other by the dielectric layer 111 disposed therebetween.

In addition, end portions of the first and second internal electrodes 121 and 122 alternately exposed from the third and fourth surfaces 3 and 4 of the body 110 may be electrically connected to the first and second external electrodes 131 and 132 disposed on the third and fourth surfaces 3 and 4 of the body 110.

According to the above configuration, when a predetermined voltage is applied to the first and second external electrodes 131 and 132, electric charges may be accumulated between the first and second internal electrodes 121 and 122.

In this case, capacitance of the multilayer capacitor 100 may be proportional to an area of the first and second internal electrodes 121 and 122 in the active region 115 overlapping each other in the Z direction.

The first and second external electrodes 131 and 132 may be electrodes to which voltages of different polarities are applied, may be disposed on both end portions of the body 110 in the X direction, respectively, and may be connected to end portions of the first and second internal electrodes 121 and 122 exposed from the third and fourth surfaces 3 and 4 of the body 110, to form a capacitor circuit.

The first external electrode 131 may include a first connection portion 131a and a first bend portion 131b.

The first connection portion 131a may be formed on the third surface 3 of the body 110, and may be a portion connected to a portion from which the first internal electrode 121 is exposed, and the first bend portion 131b may be a portion extending from the first connection portion 131a to a portion of the first surface 1 of the body 110, which may be a mounting surface.

In this case, the first bend portion 131b may further extend to portions of the fifth and sixth surfaces 5 and 6 of the body 110 and a portion of the second surface 2 of the body 110, to improve adhesion strength and the like.

The second external electrode 132 may include a second connection portion 132a and a second bend portion 132b.

The second connection portion 132a may be formed on the fourth surface 4 of the body 110, and may be a portion connected to a portion from which the second internal electrode 122 is exposed, and the second bend portion 132b may be a portion extending from the second connection portion 132a to a portion of the first surface 1 of the body 110, which may be a mounting surface.

In this case, the second bend portion 132b may further extend to portions of the fifth and sixth surfaces 5 and 6 of the body 110 and a portion of the second surface 2 of the body 110, to improve adhesion strength and the like.

In addition, the first and second external electrodes 131 and 132 may include a conductive layer formed on the third and fourth surfaces 3 and 4 of the body 110, and a plating layer formed on the conductive layer, as necessary.

In this case, the plating layer may include a nickel (Ni) plating layer formed on the conductive layer, and a tin (Sn) plating layer formed on the nickel (Ni) plating layer.

In general, a dielectric material containing $BaTiO_3$ may have defects, for examples incorporation of impurities in a lattice, formation of voids during a manufacturing process thereof, or the like.

A method of manufacturing a dielectric material containing $BaTiO_3$, which may be massively produced, may be mainly divided into a solid-phase method and a liquid-phase method.

In the solid phase method, which is manufactured at a high temperature of about 800° C., there may be few defects due to the high-temperature synthesis method. Particle size distribution in the method may be uneven due to necking and condensation between fine particles, the method may generally involve an aqueous fine pulverization process, and may increase surface defects due to elution of a Ba component.

In the liquid phase synthesis method, synthesis of the method may be generally carried out at a low temperature of 300° C. or less, and the method may not avoid an increase in defects such as hydroxyl defects due to involvement of a low temperature synthesis and an aqueous reaction.

In a multilayer capacitor, in order to form a dielectric layer 111 having a high dielectric constant, it is necessary to use $BaTiO_3$ base powder having high crystallinity. In this case, in order to thin the dielectric layer 111 and maintain reliability, fine-grained base powder is required.

When a size of a base material is large and non-uniform, a degree of flatness of a dielectric layer may decrease, and a thickness of the dielectric layer and electric field to be applied may be non-uniform, which causes deterioration in reliability. Therefore, as the base material has a small size and is more uniform, a multilayer capacitor having more reliability may be manufactured.

In addition, in the $BaTiO_3$ dielectric powder, as the particle size is small due to an effect of the size, a decrease in dielectric constant may be involved. Therefore, it may be important to select a size and crystallinity of the powder in consideration of dielectric and reliability characteristics of the multilayer capacitor to be massively produced.

In this embodiment, in order to manufacture a multilayer capacitor having excellent dielectric constant and reliability, a 2-step hydrothermal synthesis method may be applied to use $BaTiO_3$ powder having an average size of 200 nm or less, more preferably 100 to 160 nm, having high crystallinity and excellent particle size distribution.

Hereinafter, the present disclosure will be described in more detail through Inventive Examples and Comparative Examples. These are to help a specific understanding of the present disclosure, and the scope of the present disclosure is not limited by the following examples.

First, as main components, $BaTiO_3$ ferroelectric powder, and additives of $BaCO_3$, $MgCO_3$, $SiO_2$, $Al_2O_3$, $Dy_2O_3$, $Mn_3O_4$, and $V_2O_5$ were mixed with a dispersant using ethanol and toluene as solvents, and then a binder and a plasticizer were mixed therewith, to prepare a ceramic sheet.

After printing and stacking Ni electrodes on the prepared ceramic sheet, the stacked ceramic sheet were compressed and cut to prepare chips, the prepared chips were calcined for removal of the binder therefrom, and were then sintered between 1050 and 1250° C., to evaluate electrical properties and reliability. As a main component base material, $BaTiO_3$ powders having an average particle size of 200 nm or less were used.

Raw material powders containing main components and subsidiary components was used with zirconia balls as a mixing/dispersing media, and ethanol/toluene, a dispersant, and a binder were mixed, and beads milling was then performed.

Prepared slurry was processed using a coater to prepare a molded sheet having a thickness of 1.0 μm or less. Then, Ni internal electrodes were printed on the molded sheet.

30 layers of cover sheets of 3 μm were stacked to prepare upper and lower cover portions, and sheets were pressurized to prepare a bar.

Then, the pressurized bar was cut into chips of 1.0 mm×0.5 mm and 0.6 mm×0.3 mm using a cutter.

Fabricated 1005/0603 size chips were calcined, sintered in a reducing atmosphere of 0.1% $H_2$/99.9% $N_2$ ($H_2O/H_2/N_2$ atmosphere) for 1 hour at a temperature of 1050 to 1250° C., and then heated by re-oxidation at a temperature of 1000° C. in an $N_2$ atmosphere for 3 hours.

The sintered chips were processed by a termination process and an electrode sintering process using a copper (Cu) paste, to prepare an external electrode.

Therefore, after sintering, ultra-thin multilayer capacitors having a dielectric layer 111 thickness of about 0.7 μm or less and having dielectric constants and grain sizes, illustrated in Table 1 below, were prepared.

The number of pores present in a dielectric grain was calculated by observing a predetermined number of grains, e.g., 100 grains, at a predetermined number of locations, e.g., two random locations, by a scanning transmission electron microscope (STEM) (40K) analysis. Other methods and/or tools appreciated by one of ordinary skill in the art, even if not described in the present disclosure, may also be used. The predetermined number of grains observed and the predetermined number of random locations selected for measurement may be appreciated by one of ordinary skill in the art. Depending on a sample processing, each grain may have a shape with an unclear core-shell structure. All the grains observed were denoted as a denominator, to calculate the number of grains having pores as a fraction.

In this case, the core may be clearly detected by analysis of a reorganized shell and a composition due to sufficient diffusion of the additives.

For example, for rare earth elements that may be one of the dielectric additives, added at the highest concentration, when addition concentrations are mapped by TEM-EDS analysis, no additives were detected in the core, as compared to the shell in which the additives were uniformly observed, except for a secondary phase.

In another example, when observing grains in the above analysis, a cut surface of the body 110 may be used. Such a cut surface may include a cross-sectional surface obtained by cutting the body 110 in the first direction (X direction)—third direction (Z direction) plane, or a cut surface cut the body 110 in the first direction (X direction)—second direction (Y direction) plane. In a case that the cut surface includes a surface cut the body 110 in the first direction (X direction)—third direction (Z direction) plane, the cut surface may cut a central portion of the body 110 in the second direction (Y direction), and in a case that the cut surface includes a surface cut the body 110 in the first direction (X direction)—second direction (Y direction) plane, the cut surface may cut a central portion of the body 110 in the third direction (Z direction). The location of the cut surface is not limited to these examples, and one of ordinary skill may select the cut surface at other locations in the body 110, if needed. For example, when multiple measurements are performed at different cut surfaces, the cut surfaces may be in the first direction (X direction)—third direction (Z direction) plane and have an internal in the second direction (Y direction) set by one of ordinary skill in the art, or in the first direction (X direction)—second direction (Y direction) plane and have an internal in the third direction (Z direction) set by one of ordinary skill in the art.

As detailed above, the number of pores present in a dielectric grain may be counted by observing a predetermined number of grains included in a unit area within a cut surface of the body 110. The unit area may have a square shape, and may have a size of, for example, 3 μm×3 μm, 2 μm×2 μm, 1 μm×1 μm, or 0.5 μm×0.5 μm. The unit area may not be limited to a square shape. For example, the unit area may have a rectangular shape having one side having a length from 0.5 to 3 μm and another side having a height from 0.5 to 3 μm. In another example, the height of the unit area may be the thickness of the dielectric layer 111. For another example, the unit area may have a circular shape having a diameter from 0.5 to 3 μm.

The size and the shape of unit are not limited to these examples, and one of ordinary skill may select other sizes or shapes, if needed.

The unit area in the measurement may be located at a central portion of the cut surface, for example. In a case multiple measurements are performed at different locations of the same cut surface, one of the measurements may be performed at the central portion of the cut surface, and the remaining measurements may be performed at portions having an interval from the central portion set by one of ordinary skill in the art. The location of the unit area may not be limited thereto, and may be selected differently by one of ordinary skill in the art, if needed.

It should be understood that the same standard may be applied to determine whether grains associated with the measured unit area are counted in determining the ratio of grains having two or less pores with respect to overall grains in the measured unit area. For example, the grains counted in the measurement may include the grains completely inside the selected unit area, and also include the grains tangent to the boundary or touching the boundary of the selected unit area but not crossing the boundary of the selected unit area. Alternatively, the grains counted in the measurement may include the grains completely inside the selected unit area, and also include the grains touching the boundary of the selected unit area or crossing the boundary of the selected unit area.

In one example, the ratio of grains having two or less pores may be calculated by obtaining ratios of grains having two or less pores, among grains respectively obtained in a plurality of unit areas in a cut surface of the body 110 and averaging the obtained ratios associated with the plurality of unit areas.

TABLE 1

| #. | Dielectric Constant | Dielectric Constant/ Grain Size | Pore Number/Grain | Ratio of Grains having Pores | 105° C. TCC | reliability |
|---|---|---|---|---|---|---|
| 1 | 2000 | 20 | 2 or less | 71% | less than −22% | X |
| 2 | 2500 | 21 | 2 or less | 45% | less than −22% | X |
| 3 | 2700 | 23 | 2 or less | 40% | less than −22% | ○ |
| 4 | 3000 | 23 | 2 or less | 34% | less than −22% | ○ |
| 5 | 3500 | 23 | 2 or less | 34% | less than −22% | ○ |
| 6 | 4000 | 20 | 2 or less | 24% | less than −22% | ○ |
| 7 | 4000 | 20 | 2 or less | 20% | less than −22% | ○ |
| 8 | 4200 | 18 | 2 or less | 19% | −22% or more | ○ |
| 9 | 4400 | 18 | 2 or less | 18% | −22% or more | X |
| 10 | 4800 | 16 | 2 or less | 12% | −22% or more | X |
| 11 | 5200 | 15 | 2 or less | 8% | −22% or more | X |
| 12 | 3000 | 15 | 2 or less | 24% | −22% or more | ○ |
| 13 | 3500 | 14 | 2 or less | 30% | −22% or more | ○ |
| 14 | 4000 | 13 | 2 or less | 12% | −22% or more | ○ |
| 15 | 3000 | 15 | 2 or less | 15% | −22% or more | ○ |
| 16 | 4000 | 13 | 2 or less | 21% | −22% or more | ○ |

TABLE 1-continued

| #. | Dielectric Constant | Dielectric Constant/ Grain Size | Pore Number/Grain | Ratio of Grains having Pores | 105° C. TCC | reliability |
|---|---|---|---|---|---|---|
| 17 | 4500 | 13 | 2 or less | 5% | −22% or more | X |
| 18 | 2500 | 13 | 3 or more | 64% | less than −22% | X |
| 19 | 3300 | 13 | 3 or more | 51% | less than −22% | X |
| 20 | 3800 | 13 | 3 or more | 40% | less than −22% | X |
| 21 | 4800 | 14 | 3 or more | 32% | −22% or more | X |

Defects present in a raw material BT may aggregate and form pores during a high-temperature sintering process. The larger the final grain size compared to the raw material size, i.e., the higher the grain growth rate, the larger the shell fraction. Therefore, the number of pores observed may decrease.

When such grain growth is greatly accompanied, chip characteristics such as temperature characteristics and reliability may deteriorate. In order to derive the characteristics with high dielectric constant compared to the grain size, crystallinity of the raw material BT should be high. In addition, to realize high reliability and reduce the chip characteristic dispersion, a structure with a small grain size is desirable.

Multilayer capacitors may realize superior characteristics as they have a higher capacitance within the specification, and the grain size may be controlled and adjusted by sintering under severe conditions (generally, by increasing the sintering temperature and lengthening the holding time). As the grain size increases, a high dielectric constant and high chip capacitance may be realized.

Since this method has deterioration in temperature change rate (TCC) of a capacitance value, it is desirable to increase a dielectric constant value relative to a grain size by applying high crystallinity BT to increase an inherent dielectric constant of a material.

In a $BaTiO_3$ synthesis process, amounts of defects in a particle may be changed depending on process conditions. In a hydrothermal synthesis process applied in the present disclosure, amounts of defects may generally increase as a synthesis temperature/pressure decreases. As a result, the number of pores in a grain in a multilayer capacitor will increase.

In a multilayer capacitor to which such a powder having many defects is applied, the dielectric constant relative to the grain size may be relatively low, and high reliability may not be realized in a thin layer of 0.7 μm or less, such as #8 to #21.

In addition, defects present in $BaTiO_3$ may aggregate during high-temperature sintering of the above process to form pores. In the shell, since a lattice may be rebuilt together with the additive component during the sintering, there may be almost no pores, and pores may be intensively present in the core.

Therefore, in such pore formation, a ratio of the final grain size to the powder raw material, i.e., a grain growth rate may increase to control a ratio of grains having pores such as #8 to #11, #14, #15, and #17 to less than 20%. When such a grain growth-based dielectric structure is formed, the temperature characteristic may be deteriorated as described above.

Therefore, as a result of the analysis, when a ratio of dielectric constant/grain size is 20 or more, the number of pores is less than 2, and a ratio of grains having pores is 20 to 40%, it can be confirmed that it has excellent temperature characteristics (TCC) and reliability.

The present disclosure is not limited by the above-described embodiments and the accompanying drawings, but is intended to be limited by the appended claims.

According to an embodiment of the present disclosure, even when a thickness of a dielectric layer is reduced, deterioration in reliability of a multilayer capacitor may be reduced and high dielectric properties of the multilayer capacitor may be implemented.

While example embodiments have been illustrated and described above, it will be apparent to those skilled in the art that modifications and variations could be made without departing from the scope of the present disclosure as defined by the appended claims.

What is claimed is:

1. A multilayer capacitor comprising:
a body including a dielectric layer and internal electrodes; and
an external electrode disposed on the body to be connected to the internal electrodes,
wherein the dielectric layer includes a plurality of grains having a core-shell structure having a pore in a core,
the dielectric layer includes 20% to 40% of grains having two or less pores, among the plurality of grains, and
at least one core-shell structure has only one pore in the core and at least one core-shell structure has two pores in the core, among the plurality of grains.

2. The multilayer capacitor of claim 1, wherein an average size of the plurality of grains in the dielectric layer is 200 nm or less.

3. The multilayer capacitor of claim 1, wherein an average thickness of the dielectric layer is 0.7 μm or less.

4. The multilayer capacitor of claim 1, wherein a dielectric constant of the dielectric layer is 2500 to 4000.

5. The multilayer capacitor of claim 1, wherein a ratio having a dielectric constant to an average grain size in the dielectric layer is 20 $nm^{-1}$ or more.

6. The multilayer capacitor of claim 1, wherein the body comprises first and second surfaces opposing each other, third and fourth surfaces connected to the first and second surfaces and opposing each other, and fifth and sixth surfaces connected to the first and second surfaces, connected to the third and fourth surfaces, and opposing each other, and
the internal electrodes comprise first and second internal electrodes respectively exposed from the third and fourth surfaces of the body.

7. The multilayer capacitor of claim 6, wherein the external electrode includes a pair of external electrodes comprising:
a pair of connection portions respectively disposed on the third and fourth surfaces of the body; and
a pair of bend portions respectively extending from the pair of connection portions onto the first surface of the body.

8. The multilayer capacitor of claim 6, wherein the body comprises:
- an active region including the first and second internal electrodes; and
- upper and lower cover portions respectively disposed above and below the active region in a direction in which the first and second surfaces oppose each other.

9. A multilayer capacitor comprising:
- a body including a dielectric layer, including a plurality of grains, and internal electrodes; and
- an external electrode disposed on the body to be connected to the internal electrodes,
- wherein each of the plurality of grains has a core-shell structure including a pore in a core,
- a percentage of grains having two or less pores in a region of the body, among a predetermined number of grains in the region of the body, is 20% to 40%, and
- at least one core-shell structure has only one pore in the core and at least one core-shell structure has two pores in the core, among the plurality of grains.

10. The multilayer capacitor of claim 9, wherein an average size of the plurality of grains in the dielectric layer is 200 nm or less.

11. The multilayer capacitor of claim 9, wherein an average thickness of the dielectric layer is 0.7 μm or less.

12. The multilayer capacitor of claim 9, wherein a dielectric constant of the dielectric layer is 2500 to 4000.

13. The multilayer capacitor of claim 9, wherein a ratio having a dielectric constant to an average grain size in the dielectric layer is 20 $nm^{-1}$ or more.

14. A multilayer capacitor comprising:
- a body including a dielectric layer, including a plurality of grains, and internal electrodes; and
- an external electrode disposed on the body to be connected to the internal electrodes,
- wherein each of the plurality of grains has a core-shell structure including a pore in a core,
- an average of percentages of grains having two or less pores, among grains respectively obtained in a plurality of unit areas in a cut surface of the body, is 20% to 40%, and
- at least one core-shell structure has only one pore in the core and at least one core-shell structure has two pores in the core, among the plurality of grains.

15. The multilayer capacitor of claim 14, wherein an average size of the plurality of grains in the dielectric layer is 200 nm or less.

16. The multilayer capacitor of claim 14, wherein an average thickness of the dielectric layer is 0.7 μm or less.

17. The multilayer capacitor of claim 14, wherein a dielectric constant of the dielectric layer is 2500 to 4000.

18. The multilayer capacitor of claim 14, wherein a ratio having a dielectric constant to an average grain size in the dielectric layer is 20 $nm^{-1}$ or more.

* * * * *